United States Patent
Tennyson (12)

(10) Patent No.: US 6,532,216 B1
(45) Date of Patent: Mar. 11, 2003

(54) CENTRAL OFFICE BASED ADSL TEST PLATFORM

(75) Inventor: Gary Tennyson, Alabaster, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/409,689

(22) Filed: Sep. 30, 1999

(51) Int. Cl.[7] .......................... H04L 1/00; G01R 31/08; G08C 15/00

(52) U.S. Cl. .................. 370/244; 370/250; 370/507; 370/480; 379/1.04; 379/22.04; 379/27.03

(58) Field of Search ................. 370/241, 242, 370/244, 248, 250, 251, 507, 252, 480, 503, 489, 493; 375/222; 379/1.01, 1.03, 1.04, 15.03, 22.04, 26.01, 27.01, 27.03, 27.06, 28, 29.03, 29.04

(56) References Cited

U.S. PATENT DOCUMENTS

| | | | | |
|---|---|---|---|---|
| 4,679,224 A | * | 7/1987 | Lynch et al. ............. 379/29.04 |
| 5,583,912 A | * | 12/1996 | Schillaci et al. ............. 379/21 |
| 5,835,565 A | * | 11/1998 | Smith et al. ............. 379/27.04 |
| 6,002,671 A | * | 12/1999 | Kahkoska et al. .......... 370/248 |
| 6,169,785 B1 | * | 1/2001 | Okazaki .................. 379/27.01 |
| 6,212,258 B1 | * | 4/2001 | Bella et al. ............. 379/29.01 |
| 6,266,395 B1 | * | 7/2001 | Liu et al. ................. 379/27.01 |
| 6,301,227 B1 | * | 10/2001 | Antoniu et al. ............. 370/241 |
| 6,385,297 B2 | * | 5/2002 | Faulkner et al. .......... 379/1.04 |
| 6,453,016 B1 | * | 9/2002 | Chea, Jr. ................. 379/29.01 |

* cited by examiner

*Primary Examiner*—Ricky Ngo
*Assistant Examiner*—Timothy Lee
(74) *Attorney, Agent, or Firm*—Shaw Pittman LLP

(57) ABSTRACT

An apparatus for testing the installation of Asymmetric Digital Subscriber Lines (ADSLs) that includes an ADSL Transceiver Unit - Central Office (ATU-C), an ADSL Transceiver Unit - Remote (ATU-R) and a load coil detector. The apparatus can test the operation of the Central Office ATU, the quality of the POTS cable pair connecting the end-user to the Central Office and the operation of the end-user's equipment. The tests can be carried out by using a standard main distribution frame test cord to connect the test apparatus to the existing test jacks and test shoes at the main distribution frame.

20 Claims, 3 Drawing Sheets

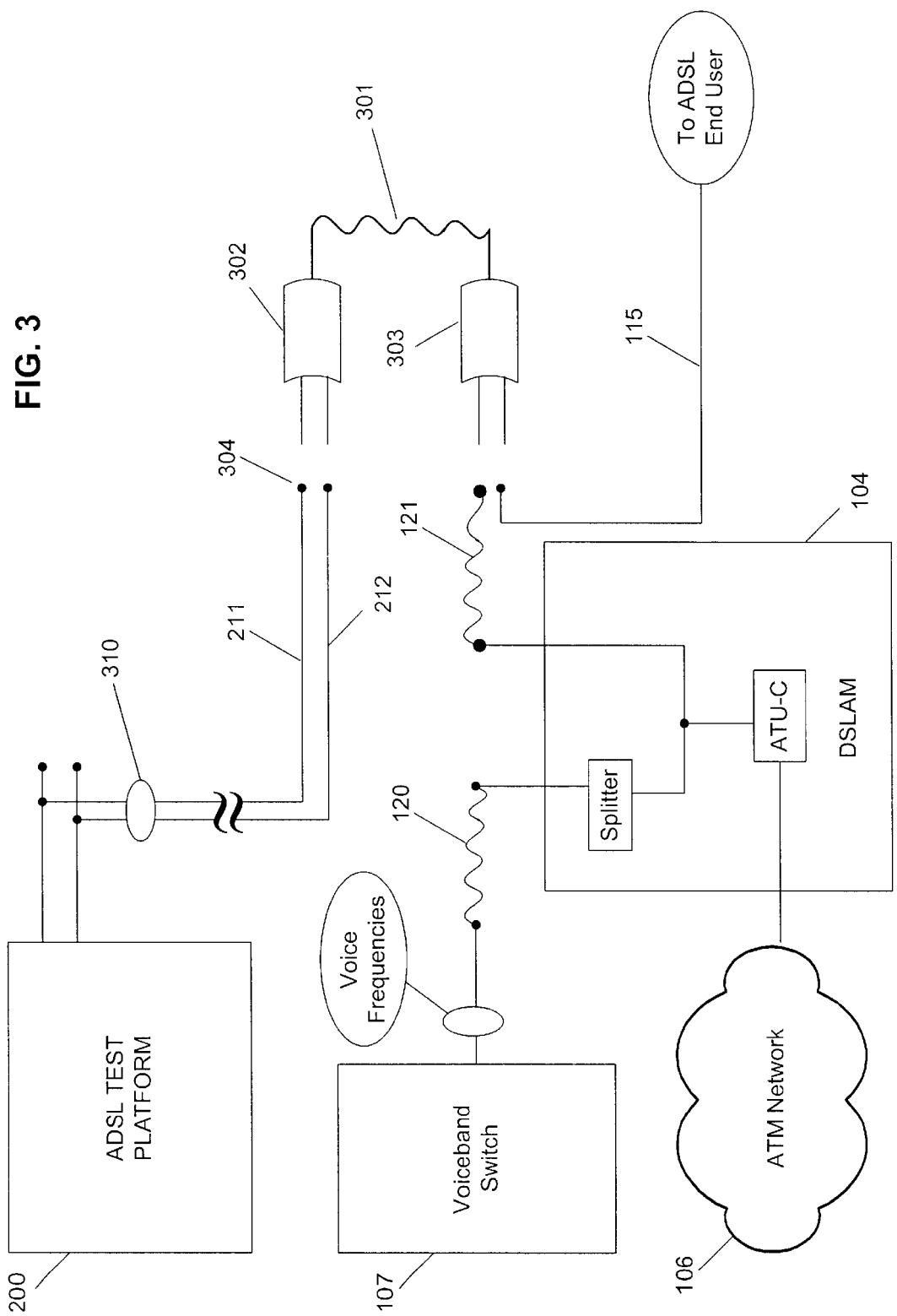

CENTRAL OFFICE BASED ADSL TEST PLATFORM

BACKGROUND

1. Field of the Invention

The present invention relates to test equipment for asymmetric digital subscriber lines (ADSLs).

2. Background of the Invention

Asymmetric Digital Subscriber Line (ADSL) technology is a high speed transmission technology that uses existing copper wire pairs from the telephone company's central office (CO) to provide high-speed data transmission to equipment at the subscribers' premises. ADSL uses a central office ADSL transceiver unit (ATU-C) and a remote transceiver unit at the subscriber's premises (ATU-R) to send high speed digital signals down the copper wires. ADSL is asymmetric, because it is designed to send information at a faster rate downstream (from the CO to the subscriber's premises) than upstream (from the subscriber premises to the CO). In the downstream direction, ADSL may be used to provide data rates ranging from 256 Kb/s to as high as 6 Mb/s, depending on the local loop. In the upstream direction, ADSL may be used to provide data rates ranging from 128 Kb/s to as high as 800 Kb/s, again depending on the local loop.

As described above, ADSL service is provided using the same outside plant (OSP) cable pair that is used to provide normal plain old telephone service (POTS), i.e., normal telephone voice service, to a customer. There is normally no interference between the voice service and the ADSL service, because ADSL uses frequencies that are well above the voice band. ADSL service is provided to a customer by installing a Digital Subscriber Line Access Multiplexer (DSLAM) at the main distribution frame (MDF) to combine the ADSL signal with the voice signal. The main distribution frame (MDF) is the apparatus that connects the telephone lines coming in from outside the CO to the internal lines in the CO. The MDF normally includes protective devices.

Specifically, ADSL service is provided by removing the jumper that otherwise connects the OSP termination to the office equipment (OE) termination, and then connecting a DSLAM to the OSP and OE termination. As shown in FIG. 1, jumper 121 is used to connect OSP termination 101 to terminal 103 of DSLAM 104, and jumper 120 is used to connect OE termination 102 to terminal 105 of DSLAM 104. Within DSLAM 104, the data signal from the Asynchronous Transfer Mode (ATM) network 106 is transmitted by ATU-C 108, using the ADSL transmission scheme. Similarly, the ADSL signal from ATU-R 114 is received by ATU-C 108, and the data from the customer is sent into ATM network 106. The signal is combined with the voice signal from voiceband switch 108. Splitter card 109 is essentially a low-pass filter that prevents the ADSL signals from reaching voiceband switch 107. The combined signal is then fed to OSP termination (or terminal) 101 via lines 110, terminal 103 and jumper 121.

Outside the MDF, the conventional OSP cable pair 111 now carries both ADSL and voice signals. At the customer premises, a splitter 112 (which is also a low-pass filter) blocks the ADSL signals from reaching the customer's telephone 113 or other device. The ADSL signals are transmitted to ATU-R 114 over lines 115, i.e., over the cable pair to the end-user's premises. Dashed line 116 represents the interface between the telephone network and the customer's premises.

The ADSL service can possibly fail, either because of faulty installation, or because the outside cable pair is simply not capable of carrying the higher-frequency ADSL signal (for example, because that cable pair is loaded down with spaced inductors). For that reason, telephone service providers usually test the ADSL installation prior to putting the ADSL in service.

| List of Acronyms | |
|---|---|
| ATU-C | ADSL Transceiver Unit, Central |
| ATU-R | ADSL Transceiver Unit, Remote |
| ADSL | Asymmetric Digital Subscriber Line |
| CO | Central Office |
| DSLAM | Digital Subscriber Line Access Multiplexer |
| DSL | Digital Subscriber Line |
| DSG | DSL Services Group |
| ISDN | Integrated Services Digital Network |
| ISP | Internet Service Provider |
| MDF | Main Distribution Frame |
| OE | Office Equipment |
| OSP | Outside Plant |
| POTS | Plain Old Telephone Service |

SUMMARY OF THE INVENTION

The present invention is an apparatus for testing the installation and operation of ADSL service at a Central Office. With the test apparatus electrically connected to a cable pair at the main distribution frame at the CO, an ATU-C and an ATU-R in the test apparatus are used to test synchronization with an end-user's ATU-R and a CO's ATU-C, respectively. A voltage detector in the test apparatus starts the test automatically when it detects a voltage applied by the CO across the lines connecting the testing apparatus to the CO.

The ATU-C and an ATU-R are mounted on a test platform, together with the voltage detector and a load coil detector. The load coil detector checks the cable pair for the presence of load coils (which, if present, would render ADSL service inoperable). The ATU-C in the test apparatus can also determine the connect speed of the end-user's ATU-R.

When not in use, i.e., when the test apparatus is idle, the ATU-C and ATU-R are connected to each other and are synchronized to each other, so that the testing technician can test them against each other to make sure that they are operating properly prior to conducting any tests of the ADSLs.

In a preferred embodiment of the present invention, when the technician connects the test apparatus to the circuit, the voltage detector in the test apparatus detects the voltage—applied to all POTS lines by the CO—and initiates the test by automatically throwing a four-pole double-throw switch from the idle position to the testing position to initiate the test.

The present invention is preferably implemented using test shoes and test jacks at the main distribution frame. Using the existing main distribution frame test shoes and test jacks provides four-wire access to the ADSL infrastructure, so that the test platform can "look out" toward the end-user as well as "look-in" toward the office (i.e., the DSLAM in the case of ADSL). This provides the capability for deploying both an ATU-C and an ATU-R. This has two advantages. First, it allows the CO technician to test the wiring infrastructure at the CO, and also to obtain an indication of the end-user's connect speed. Second, it allows the test ATUs to remain logically connected when not in use, which provides known-good units, whenever such units are needed for a test. The connection towards the end-user also allows the use of the test apparatus as a convenient platform to house a load coil detector, which could check for the presence of load coils on the cable pair while the ATU-C attempts to synchronize with the end-user's ATU-R.

Accordingly, it is an object of the present invention to provide an apparatus and method for testing the installation of ADSL service over POTS lines.

It is also an object of the present invention to provide a two-way test of ADSL installations, that tests the wiring and apparatus at the central office and the wiring and apparatus at the end-user's location.

It is a further object of the present invention to test for the presence of load coils in outside line cable pairs.

BRIEF DESCRIPTION OF THE DRAWINGS

FIG. 3 is a schematic diagram showing how the apparatus of the present invention is connected to the main distribution frame for testing.

Figure 1:
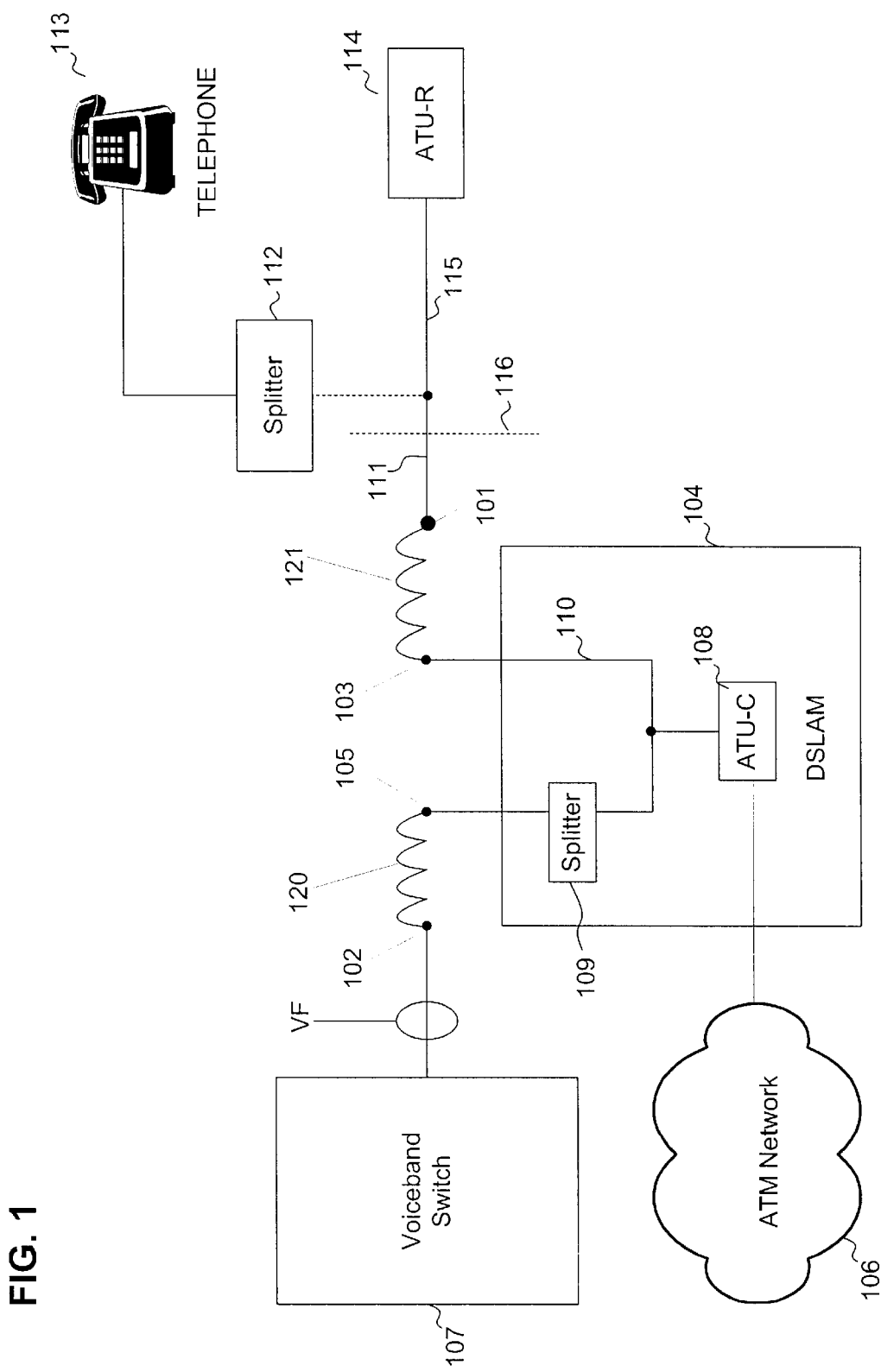
FIG. 1 is a schematic diagram of a circuit for providing ADSL service over a conventional telephone network.
Figure 2:
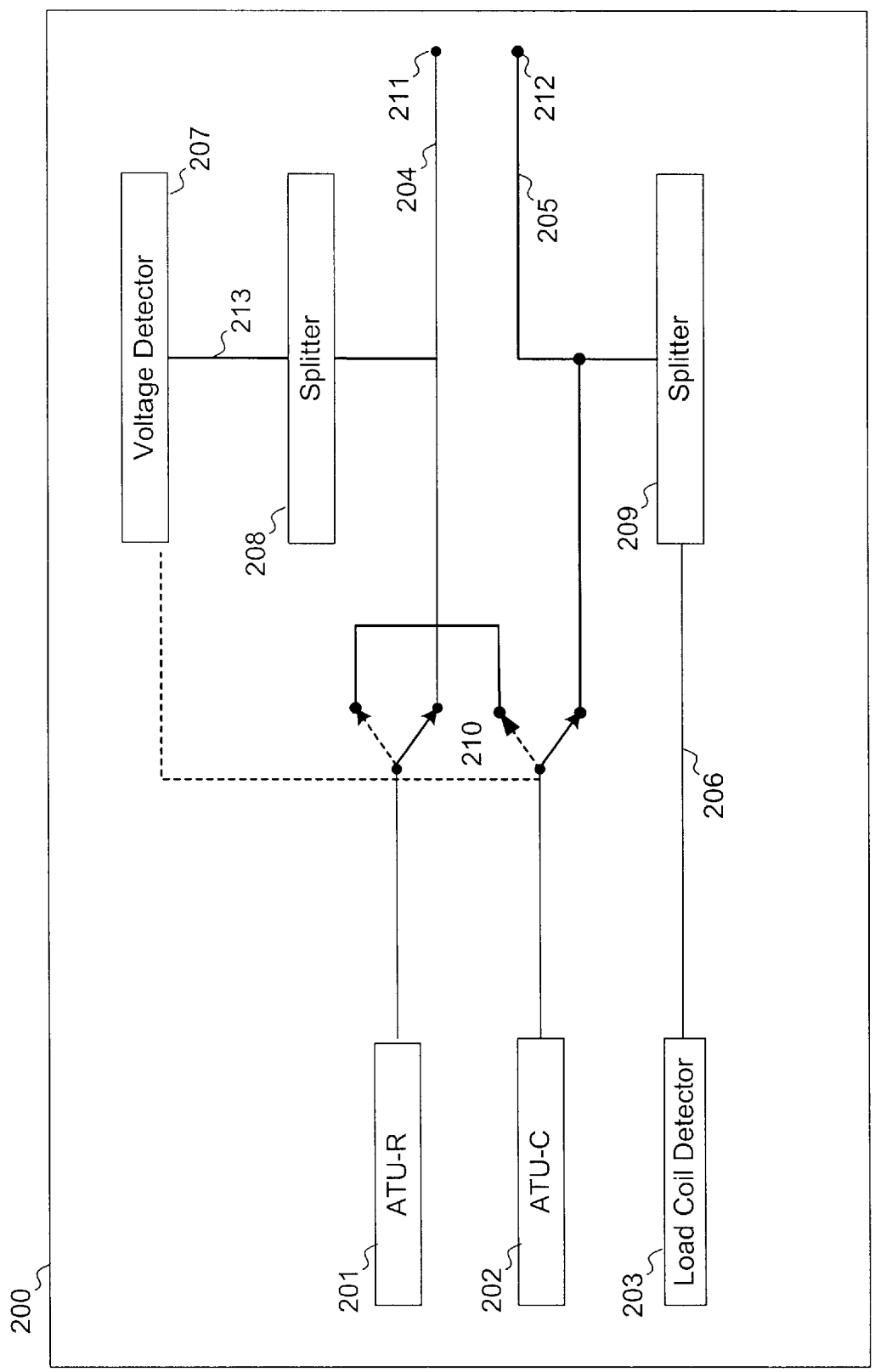
FIG. 2 is a schematic diagram of the apparatus of the present invention.

For clarity, the circuits shown in FIGS. 1–3 only show one line, rather than two lines, to represent a pair of lines.

DETAILED DESCRIPTION OF THE INVENTION

FIG. 2 is a schematic diagram representing the electrical circuit of the present invention. As shown in FIG. 2, ADSL test platform 200 of the present invention includes ATU-R 201, ATU-C 202, load coil detector 203 and voltage detector 207.

The ADSL test is conducted with four-pole double-throw switch 210 in the down position, as shown by the solid arrow in FIG. 2 (as noted above, the main lines in FIGS. 1–3 represent pairs of lines—switch 210 is a four-pole switch that can simultaneously switch all four lines in the two pairs of lines). Switch 210 is mounted on a relay that is electrically connected to voltage detector 207, such that voltage detector 207 can "throw" switch 210 from the idle position to the testing position and vice-versa, by applying a voltage of the appropriate polarity across the relay. With four-pole double-throw switch 210 down (solid arrows in FIG. 2), ATU-R 201 attempts to synchronize to the CO ATU-C (not shown) over lines 204 via jack 211, and ATU-C 202 attempts to synchronize to the remote ATU-R (not shown) over line 205 via jack 212. Synchronization may be indicated with, for example, a green light on each ATU, that lights up when the ATU is in synchronization with another ATU. Non-synchronization, i.e., if the ATUs fail to synchronize within a predetermined time, may be indicated with a red light.

With four-pole double-throw switch 210 up (the dashed arrows in FIG. 2), the test platform is idle. With switch 210 up, ATU-R 201 and ATU-C 202 are logically connected to each other, and are synchronized with each other. If the ATUs are operating properly in synchronization with each other, both ATUs would display a green light, for example, indicating that both ATUs are operating properly. This provides the testing technician with the assurance that both ATUs are operating correctly. Thus, if synchronization is not achieved during a test, the technician conducting the test knows that the testing ATUs are operating properly, and can therefore be confident that any failure to synchronize must be due to another cause, such as faulty installation, load coils on the cable pair, or an inoperable ATU-R at the end-user.

Voltage detector 207 detects a voltage on lines 204 (when lines 204 are connected to the CO) via line 213. When voltage detector 207 detects a voltage, it initiates a test by throwing switch 210 from the idle position (switch up in FIG. 2) to the test position (switch down in FIG. 2).

Splitter 208 prevents ADSL signals from traveling up line 213 and reaching the voltage detector. Splitter 209 prevents ADSL signals from reaching load coil detector 203.

Conventional load coil detector 203 is used to detect the presence of load coils on the cable pair (lines 205 in FIG. 2) going out to the customer. Clearly, if the lines to the customer are loaded with inductors, the lines would also fail the ADSL test as well as the load coil test. However, separately testing for the presence of load coils allows the technician to identify and isolate the problem, i.e., to distinguish between an ADSL test that failed because of the presence of load coils on the lines to the customers (which means that the customer cannot use ADSL service on those lines) and an ADSL test that failed because, for example, the installation was not done correctly (in which case the problem can be identified and resolved at the CO).

In a preferred embodiment of the present invention, ATU-R 201 and ATU-C 202, and load coil detector 203 are mounted on a rack, allowing the test apparatus to use the existing main distribution frame shoe test cords, and providing a stable test platform. Preferably, the test ATUs include an audible indication of synchronization, as well as a visual indication, such that the lines may be checked without requiring the technician to have a line of sight view of the test ATU. For example, a bell could sound to indicate synchronization, and a different audible signal, e.g., a buzzer could sound to indicate non-synchronization. Test ATU-C also preferably includes a visual display of the connect speed from the user's remote ATU.

FIG. 3 is a schematic diagram showing how ADSL test platform 200 of the present invention is electrically connected to the MDF for use in a test. Lines 310 are the permanently installed ADSL 4-wire test circuit lines, which are "multipled," i.e., placed in parallel, via shielded wire to other test jacks on the MDF. Existing MDF test shoe cord 301 (with test plug 302 and MDF test shoe 303) is used to electrically connect lines 204 and 205 of the test platform to the telephone network at the MDF, by plugging test plug 302 into MDF test jack 304. ATM network 106 transmits ADSL signals to DSLAM 104. MDF test shoe 303 fits into the same socket on the MDF as do the electrical protection devices that are conventionally used to protect the MDF.

The test platform of the present invention can be conveniently plugged in to an MDF by removing a five-pin over-voltage and over-current protector from the MDF, and connecting test shoe 303 in place of the protector.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A test apparatus comprising:

(a) an asymmetric digital subscriber line transceiver unit—central office for synchronization tests of remote asymmetric digital subscriber line transceiver units;

(b) an asymmetric digital subscriber line transceiver unit—remote for synchronization tests of central office asymmetric digital subscriber line transceiver units electrically connected to the switch;

(c) a voltage detector for detecting a voltage across a pair of lines, said pair of lines connecting the test apparatus to a central office when the test apparatus is connected to the central office; and (d) a switch having an idle position and a test position, wherein when the voltage detector detects a voltage across the pair of lines, it causes the switch to move from its idle position to its test position and thus initiate synchronization tests of remote asymmetric digital subscriber line transceiver units and central office asymmetric digital subscriber line transceiver units.

2. The test apparatus of claim 1, further comprising a load coil detector for determining whether a cable pair is loaded.

3. The test apparatus of claim 1, wherein the central office asymmetric digital subscriber line transceiver unit in the test apparatus also determines the connect speed of an end-user's remote asymmetric digital subscriber line transceiver unit.

4. The test apparatus of claim 1, wherein the switch is a four-pole double-throw switch.

5. The test apparatus of claim 1, wherein the asymmetric digital subscriber line transceiver unit—central office and the asymmetric digital subscriber line transceiver unit—remote are logically connected to each other when idle.

6. The test apparatus of claim 1, wherein the asymmetric digital subscriber line transceiver unit—central office and the asymmetric digital subscriber line transceiver unit—remote provide audible as well as visual indications of synchronization.

7. The test apparatus of claim 6, wherein the asymmetric digital subscriber line transceiver unit—central office and the asymmetric digital subscriber line transceiver unit—remote provide audible as well as visual indications of non-synchronization.

8. A method for testing the installation of an asymmetric digital subscriber line at a central office on a cable pair to an end-user comprising:

(a) detecting a voltage across a cable pair to the central office;

(b) when a voltage is detected across the cable pair, automatically initiating synchronization tests of a central office's asymmetric digital subscriber line transceiver unit—central office and an end-user's asymmetric digital subscriber line transceiver unit—remote with a asymmetric digital subscriber line transceiver unit—remote and an asymmetric digital subscriber line transceiver unit—central office installed on a test apparatus, respectively; and (c) determining whether the asymmetric digital subscriber line was properly installed.

9. The method of claim 8, further comprising detecting the presence or absence of load coils on the cable pair using a load coil detector.

10. The method of claim 8, further comprising electrically connecting the test apparatus to the cable pair at a main distribution frame by connecting the test apparatus to a test shoe on the main distribution frame.

11. The method of claim 8, wherein the test apparatus provides audible as well as visual indications of synchronization.

12. The method of claim 11, wherein the test apparatus provides audible as well as visual indications of non-synchronization.

13. The method of claim 8, further comprising the step of determining the connect speed of the end-user's a asymmetric digital subscriber line transceiver unit—remote.

14. The method of claim 8, wherein the synchronization tests are automatically initiated by applying a voltage across a relay to throw a double-pole switch from its idle position to its test position.

15. A test apparatus comprising:

(a) an asymmetric digital subscriber line transceiver unit—central office switchably connected to a pair of lines to a central office asymmetric digital subscriber line transceiver unit—remote;

(b) an asymmetric digital subscriber line transceiver unit—remote switchably connected to a pair of lines to a remote asymmetric digital subscriber line transceiver unit—central office; and (c) a voltage detector electrically connected to the pair of lines switchably connected to the central office asymmetric digital subscriber line transceiver unit—remote, wherein the voltage detector automatically switches pair of lines to the central office asymmetric digital subscriber line transceiver unit—remote and the pair of lines to the remote asymmetric digital subscriber line transceiver unit—central office to initiate synchronization tests when it detects a voltage across the pair of lines.

16. The test apparatus of claim 15, further comprising a load coil detector.

17. The test apparatus of claim 15, wherein the asymmetric digital subscriber line transceiver unit—central office in the test apparatus also determines the connect speed of an end-user's remote asymmetric digital subscriber line transceiver unit.

18. The test apparatus of claim 15, wherein the asymmetric digital subscriber line transceiver unit—central office and the asymmetric digital subscriber line transceiver unit—remote are logically connected to each other when idle.

19. The test apparatus of claim 15, wherein the asymmetric digital subscriber line transceiver unit—central office and the asymmetric digital subscriber line transceiver unit—remote provide audible as well as visual indications of synchronization.

20. The test apparatus of claim 19, wherein the asymmetric digital subscriber line transceiver unit—central office and the asymmetric digital subscriber line transceiver unit—remote provide audible as well as visual indications of non-synchronization.

* * * * *